US009536268B2

(12) United States Patent
Serena

(10) Patent No.: US 9,536,268 B2
(45) Date of Patent: Jan. 3, 2017

(54) SOCIAL NETWORK GRAPH INFERENCE AND AGGREGATION WITH PORTABILITY, PROTECTED SHARED CONTENT, AND APPLICATION PROGRAMS SPANNING MULTIPLE SOCIAL NETWORKS

(76) Inventor: F. David Serena, Camarillo, CA (US)

(*) Notice: Subject to any disclaimer, the term of this patent is extended or adjusted under 35 U.S.C. 154(b) by 620 days.

(21) Appl. No.: 13/221,893

(22) Filed: Aug. 30, 2011

(65) Prior Publication Data

US 2013/0031171 A1 Jan. 31, 2013

Related U.S. Application Data

(60) Provisional application No. 61/511,983, filed on Jul. 26, 2011.

(51) Int. Cl.
*G06F 15/16* (2006.01)
*G06F 7/00* (2006.01)
(Continued)

(52) U.S. Cl.
CPC ............. *G06Q 50/01* (2013.01); *H04L 51/32* (2013.01); *H04L 63/102* (2013.01); *H04L 63/104* (2013.01);
(Continued)

(58) Field of Classification Search
CPC ........ H04L 51/32; H04L 67/306; H04L 67/10; H04L 67/22; H04L 63/102; H04L 63/104
(Continued)

(56) References Cited

U.S. PATENT DOCUMENTS 7,249,123 B2 7/2007 Elder et al.
7,512,612 B1 3/2009 Akella et al.
(Continued)

FOREIGN PATENT DOCUMENTS

JP 2001-175680 6/2001
WO WO 2010-048172 4/2010

OTHER PUBLICATIONS

Haijin et al., "A Normal Traffic Network Covert Channel", 2009, p. 1-5, 2009 International Conference on Computational Intelligence and Security.*

(Continued)

*Primary Examiner* — Taylor Elfervig
(74) *Attorney, Agent, or Firm* — McNeely, Hare & War LLP

(57) ABSTRACT

An application program spans a plurality of digital social networks. The application program includes an inferred digital social network. Consent is obtained from a plurality of users of the digital social networks to participation in the inferred digital social network. Information is automatically obtained from the digital social networks for the users, through a plurality of respective communication channels, which can be application program interfaces or covert or subliminal channels. The information includes link information between each of the users and other individuals in the digital social networks. The information is aggregated for the users to form the inferred digital social network, corresponding to a graph having nodes representing the users and the other individuals and having links between the nodes representing social relationships. Each of the users is enabled to send and receive message information with other users, to view profile information of other users, and to view social contact information of other users, through the inferred digital social network. In response to inputs from the users, the application program provides state information to the digital social networks spanned by the application program that the digital social networks cause to be communicated to users of the digital social networks.

35 Claims, 11 Drawing Sheets

(51) Int. Cl.
 G06Q 50/00 (2012.01)
 H04L 29/06 (2006.01)
 H04L 29/08 (2006.01)
 H04L 12/58 (2006.01)
(52) U.S. Cl.
 CPC ............ H04L 67/10 (2013.01); H04L 67/22 (2013.01); H04L 67/306 (2013.01)
(58) Field of Classification Search
 USPC .............................. 709/203, 204; 707/798
 See application file for complete search history.

(56) References Cited

U.S. PATENT DOCUMENTS

| | | | |
|---|---|---|---|
| 7,801,971 | B1 | 9/2010 | Amidon et al. |
| 7,886,000 | B1* | 2/2011 | Polis ................. H04L 67/2833 455/466 |
| 8,055,664 | B2 | 11/2011 | Baluja et al. |
| 2005/0216550 | A1* | 9/2005 | Paseman et al. ............ 709/202 |
| 2008/0275861 | A1 | 11/2008 | Baluja et al. |
| 2009/0197681 | A1 | 8/2009 | Krishnamoorthy et al. |
| 2010/0106573 | A1 | 4/2010 | Gallagher et al. |
| 2010/0274815 | A1* | 10/2010 | Vanasco ....................... 707/798 |
| 2010/0306815 | A1* | 12/2010 | Emerson et al. ............ 725/134 |
| 2010/0312724 | A1 | 12/2010 | Pinckney et al. |
| 2010/0318925 | A1* | 12/2010 | Sethi et al. .................. 715/760 |
| 2011/0010421 | A1* | 1/2011 | Chavez et al. ............... 709/204 |
| 2011/0276582 | A1* | 11/2011 | Schmitt .............. G06Q 10/105 707/767 |
| 2012/0117144 | A1* | 5/2012 | Douillet et al. ............ 709/203 |
| 2012/0303644 | A1* | 11/2012 | Martin, Jr. ............ G06Q 30/02 707/756 |

OTHER PUBLICATIONS

Yeung, Ching-man Au, et al. "Decentralization: The future of online social networking." W3C Workshop on the Future of Social Networking Position Papers. vol. 2. 2009.*

Bojars, Uldis, John Breslin, and Stefan Decker. "Social Networks and Data Portability using Semantic Web technologies." (2008).*

Mika, Peter. "Flink: Semantic web technology for the extraction and analysis of social networks." Web Semantics: Science, Services and Agents on the World Wide Web 3.2 (2005): 211-223.*

Razmerita, Liana, Rokas Firantas, and Martynas Jusevicius. "Towards a New Generation of Social Networks: Merging Social Web with Semantic Web." I-SEMANTICS. 2009.*

Uldis Bojars, Alexandre Passant, John Breslin, Stefan Decker "Social Networks and Data Portability using Semantic Web technologies", 2nd Workshop on Social Aspects of the Web (SAW 2008), in conjunction with 11th International Conference on Business Information Systems (BIS 2008), 2008, pp. 5-19.*

J. Vosecky, D. Hong and V. Y. Shen, "User identification across multiple social networks," 2009 First International Conference on Networked Digital Technologies, Ostrava, 2009, pp. 360-365.*

M. Jamalzadeh and N. Behravan, "Using Semantic Web Ontologies for better inter-operability on social network sites," Control System, Computing and Engineering (ICCSCE), 2011 IEEE International Conference on, Penang, 2011, pp. 103-108.*

A. Ozdaglar, "Learning and dynamics in social networks," 2009 American Control Conference, St. Louis, MO, USA, 2009, pp. 8-8.*

33bits.org; "Google+ and Privacy: A Roundup"; http://33bits.org/2011/07/03/google-and-privacy-a-roundup; Jul. 3, 2011.

Facebook; "Graph API—Facebook Developers"; https://developers.facebook.com/docs/reference/api;Jul. 20, 2011.

Finley, Klint; "Google Plus Puts Out a Call for Developers"; http://readwrite.com/2011/06/30/google-plus-puts-out-a-call-for-developers; Jun. 30, 2011.

LinkedIn Corporation; "APIs | LinkedIn Developer Network"; https://developer.linkedin.com/apis; Jul. 22, 2011.

McCullagh, Declan; "Google Wields Data Openness Against Facebook"; http://news.cnet.com/8301-31921 3-20079907-281/google-weilds-data-openness-against-facebook; Jul. 15, 2011.

Outlook Blog; "Announcing the Outlook Social Connector"; http://blogs.office.com/b/microsoft-outlook/archive/2009/11/18/announcing-the-outlook-social-connector.aspx; Jul. 3, 2011.

Schneier, Bruce; *Applied Cryptography*; John Wiley & Sons; 1996; Sections 3.6 and 3.7.

Single Grain, LLC; "The Ultimate List of Facebook Apps | Single Grain Blog"; http://www.singlegrain.com/blog/the-utlimate-list-of-facebook-apps; Jul. 16, 2011.

* cited by examiner

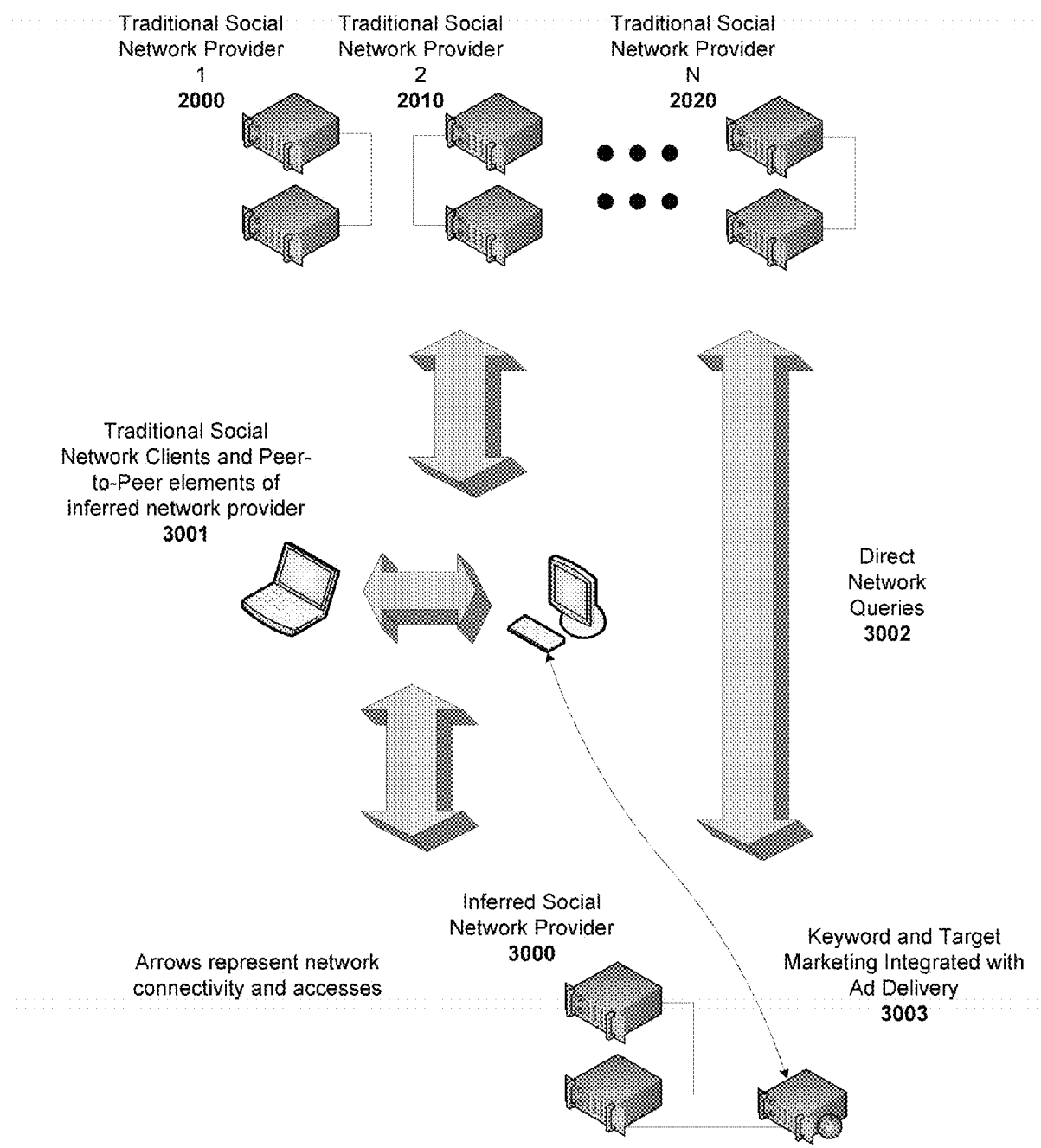

Graph Inference Process
Example. Figure 2.
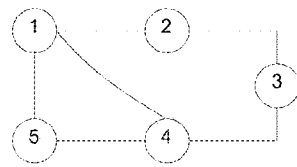
Traditional Social Network
1000
Users 1,2,4 and 5 opt-in to
inference graph algorithm
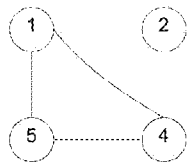
Inferred Social Network
Graph
1020
Social Network Inference
Process. Figure 3.
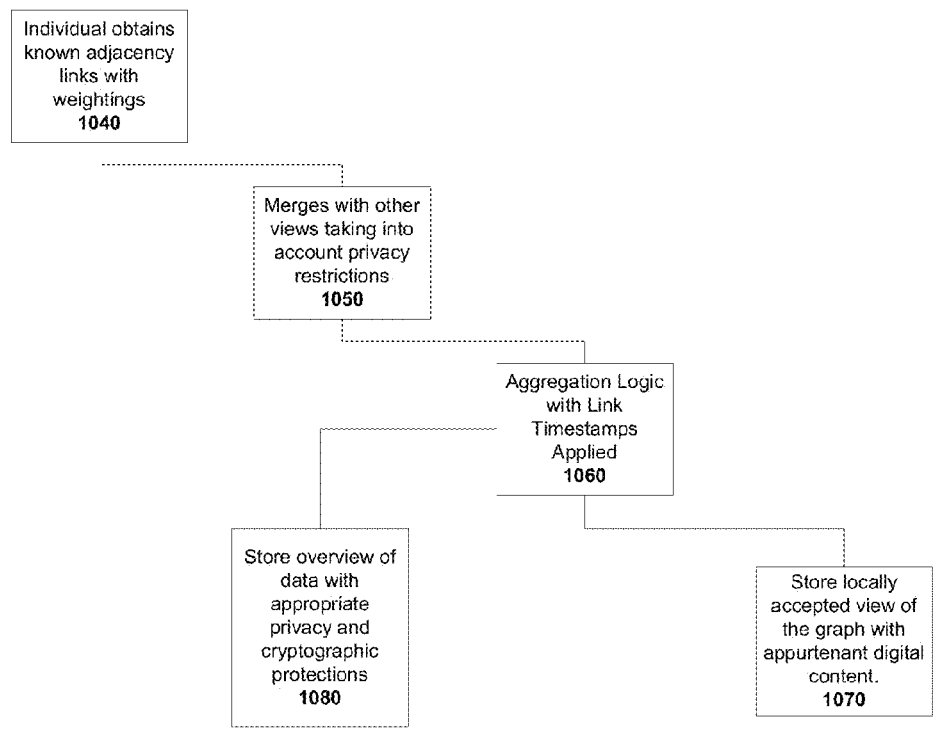

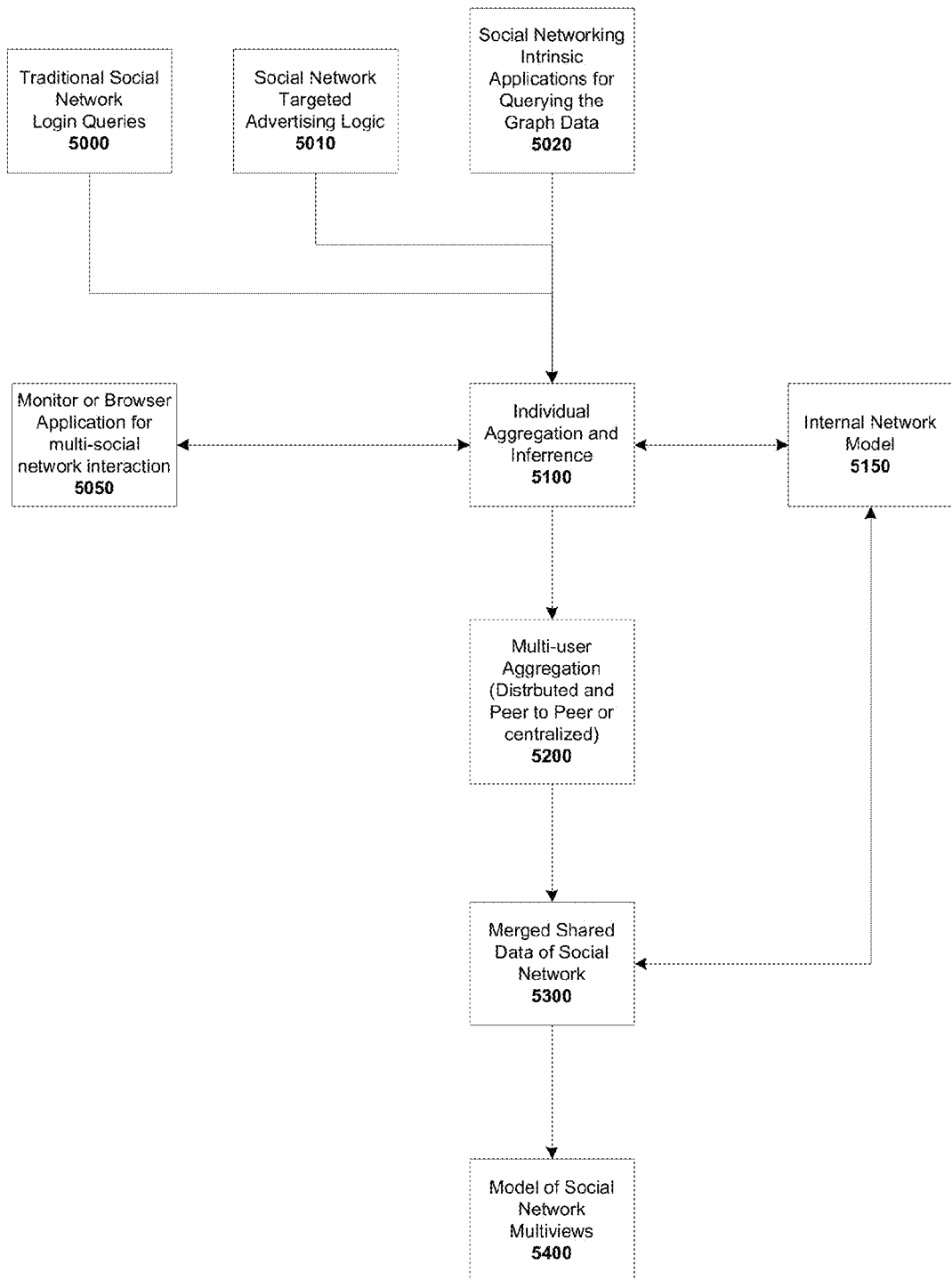
Aggregation of Inferred and Directly Entered State Information. Figure 4.

Network Inference Opt-In
Interface. Figure 5.
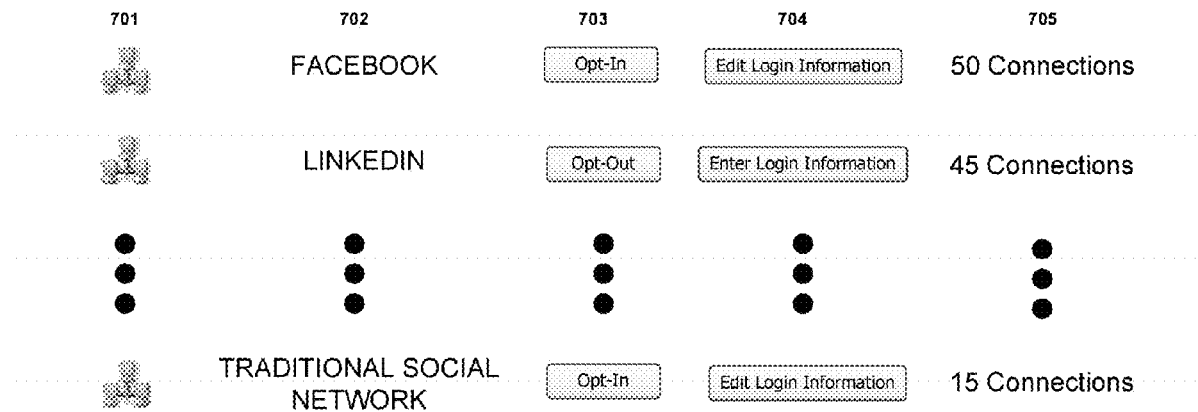
Network Inference Network
Display. Figure 6.
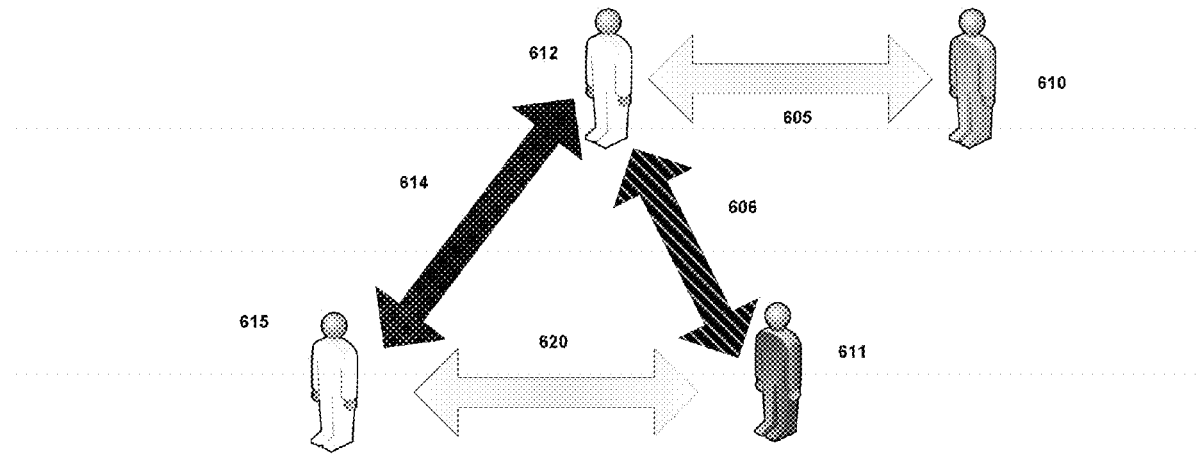
Dynamic display with coded
labeling for network source
information.

Distributed Storage of Shared Content.

Group Votes to Transfer/Migrate from Traditional Social Network Provider.

Social Network Data
Flow. Figure 9

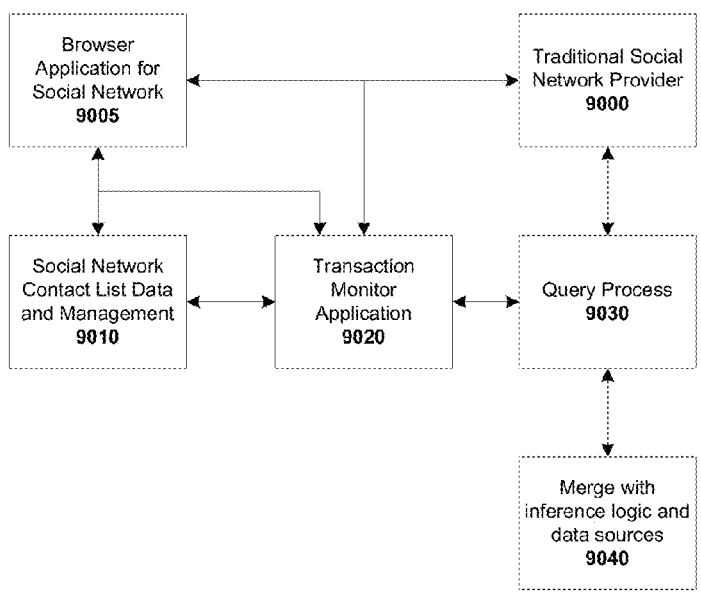

Opt-in Credentials User
Interface. Figure 10

Traditional Social Network
N

10100

```
LOGIN
PASSWORD
```
10110

SAVE

10120

Inference Methods

Select All

Contact List Inquiry...

Https/http inference

Direct Query

Collaborative Inference

10120

Privacy Settings

Friends Can Infer Network

Friends of Friends Can Infer Network

All May Infer Network

Defined Subgraph/Circle May infer

10130

Application that is Active over Multiple
Social Networks. Figure 11.
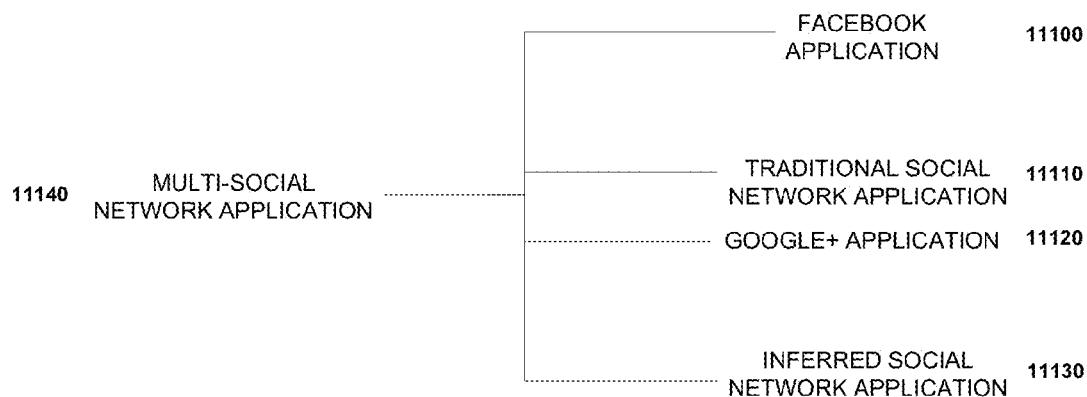
Spanning Application Extrinsic
Communication and Messaging. Figure 12.
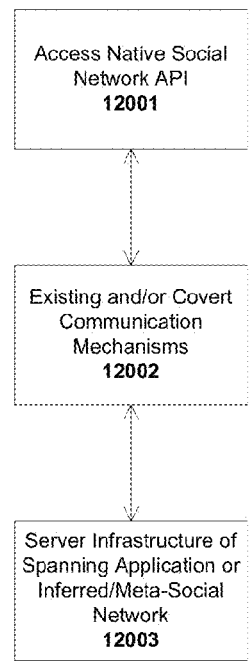

User Consent and Initiation of Participation
in Inferred Social Network. Figure 13.
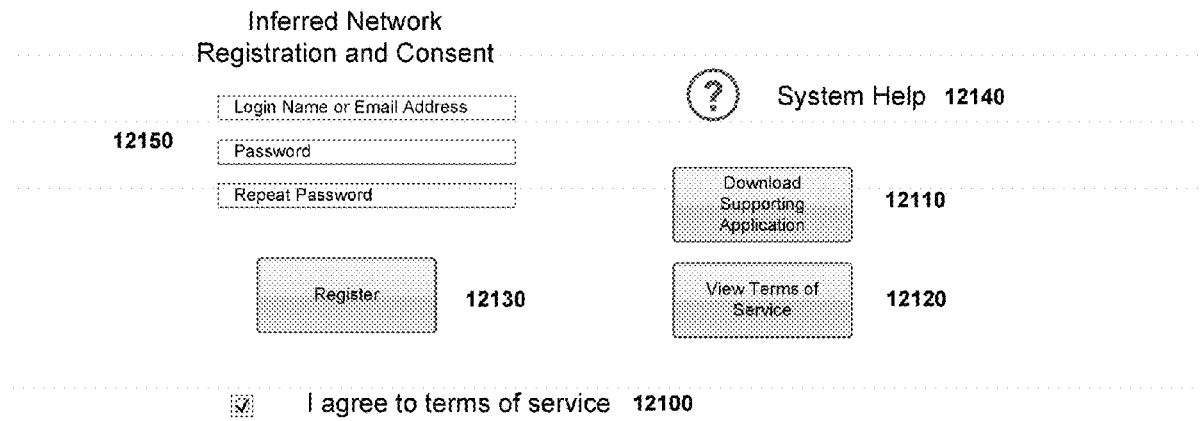
Computational Infrastructure for Meta-Social
Network Spanning Application. Figure 14.
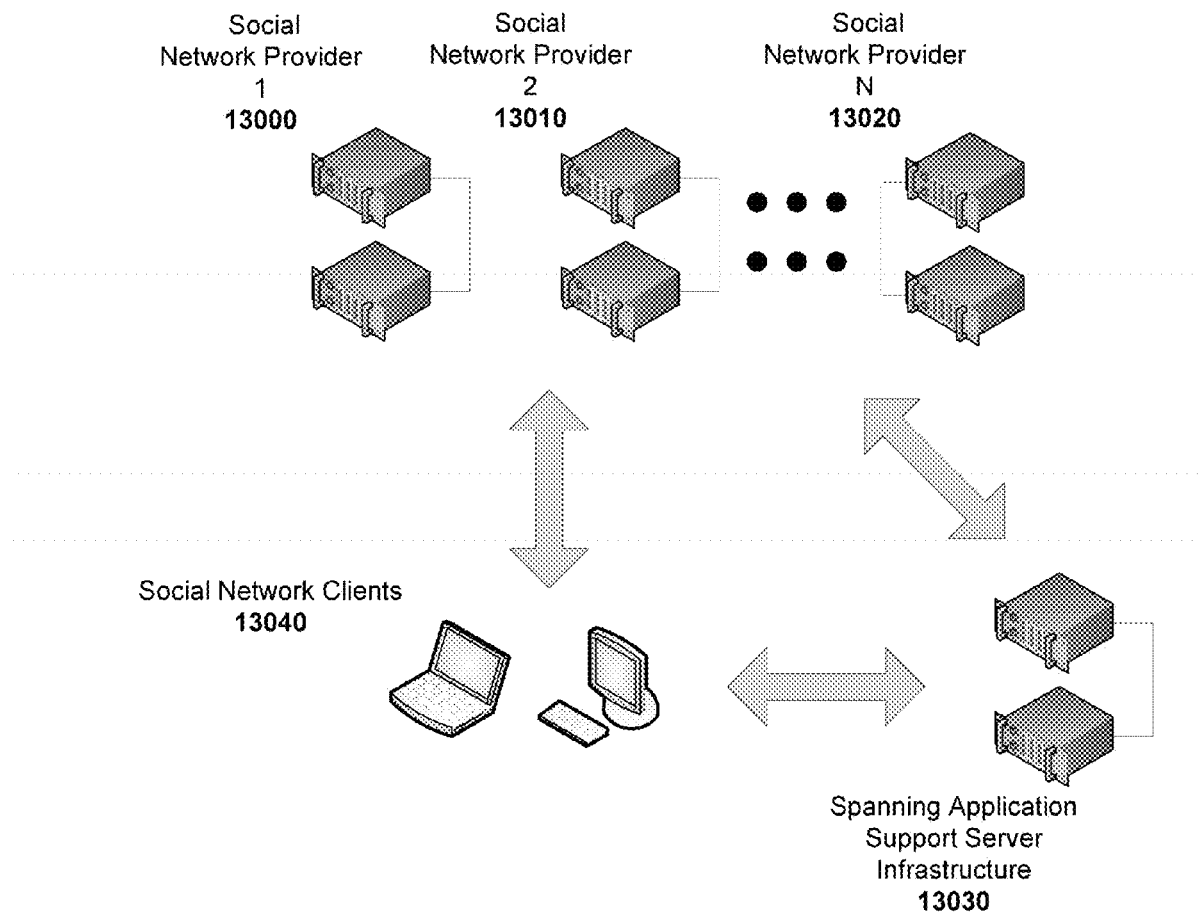

Meta-Social Network Spanning Application.
Figure 15.
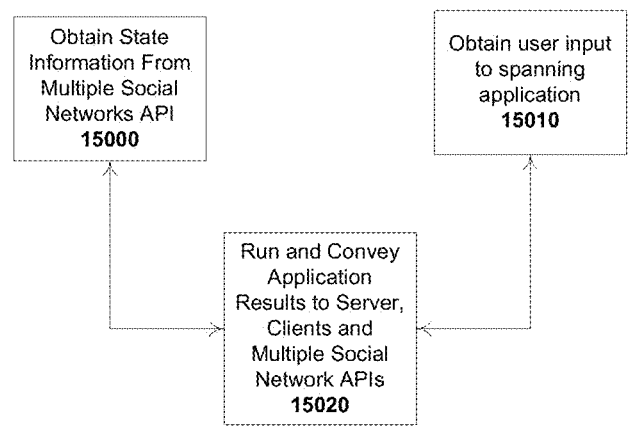
Inferred Social Network Operates as a Functional
Traditional Social Network. Figure 16.
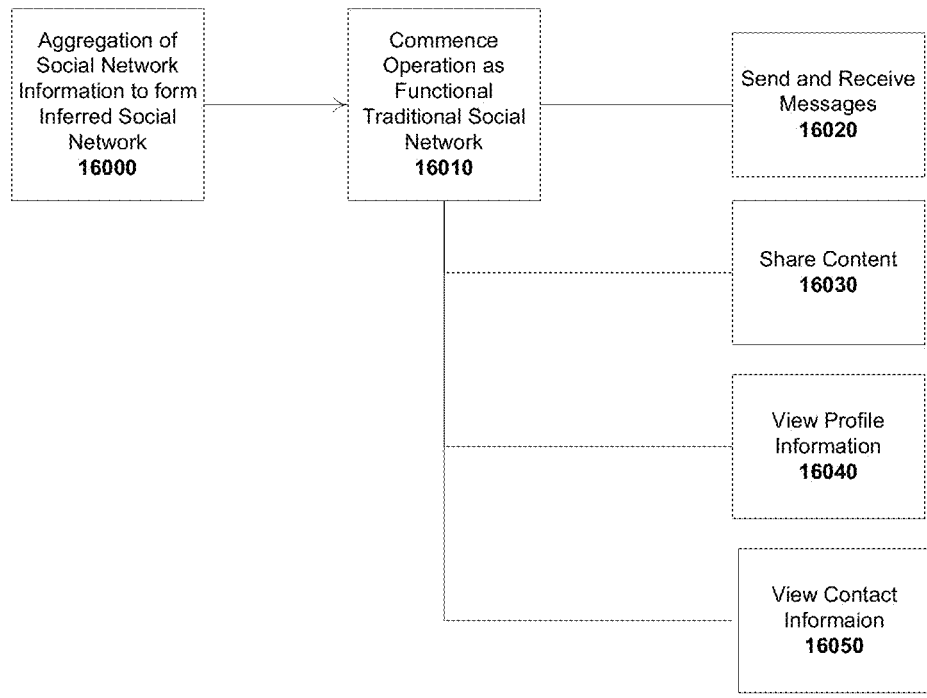

Meta-Social Network Management Interface. Figure 17.

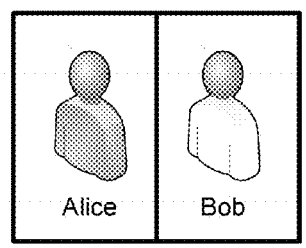
Alice | Bob (broadcast all networks) Alice: That was a great video we saw yesterday online. It really had a wonderful and uplifting theme. (on inferred network) — 154

(traditional network 1) Bob: Yes I thoroughly enjoyed it here's a related story from the news, some music and a film clip. (on inferred network) — 155

Multiple Social Networks:

152 —
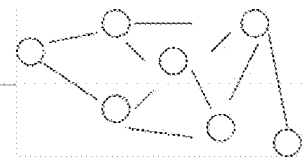

156

(traditional network 1): Eve: I agree it was a meaningful film and very creative.

(traditional network 2): Stewart: I found it thoughtful and it really defines your relationship Alice and Bob. — 157

160
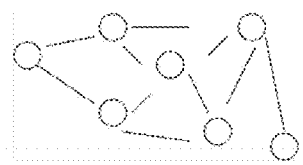

(broadcast all networks) Alice & Bob: Yes it reminds us of how we met. — 158

SOCIAL NETWORK GRAPH INFERENCE AND AGGREGATION WITH PORTABILITY, PROTECTED SHARED CONTENT, AND APPLICATION PROGRAMS SPANNING MULTIPLE SOCIAL NETWORKS

CROSS-REFERENCE TO RELATED APPLICATION

This patent application claims the benefit of F. David Serena, Provisional Application No. 61/511,983, filed Jul. 26, 2011, which is hereby incorporated herein in its entirety.

TECHNICAL FIELD

The field of the invention generally relates to computer-based social networks, and more particularly to social networks inferred from pre-existing traditional social networks, and application programs that span multiple pre-existing traditional social networks.

BACKGROUND

Computer-based social networks such as FACEBOOK, GOOGLE+, PING, or LINKEDIN provide opportunities for individuals to maintain, nurture, and develop relationships with friends or business contacts. These networks typically enable their participants to view profiles of other participants, and to link with other participants with whom a pre-existing actual relationship exists or with whom an actual social or business relationship is desired. Typically, once linked together through a computer-based social network, participants can exchange communications, photographs, or other media content, and can view the identities of persons with whom the other participant has relationships through the social relationship network.

Social networks can be represented by a graph structure wherein nodes are individuals or other entities and links (potentially weighted) represent connections between the parties. It has been assumed in modern large social networks such as FACEBOOK, GOOGLE+, PING and LINKEDIN that the network itself is owned by the major providers. Many of the rights, however, are owned by the constituent members of the social network (some of these ownership rights of the user are actually specified in "terms of service").

Graph inference is a technology that determines graph content through observations and logical inference. The technology is to determine overall graph structure from partial information. Social networks contain more state information (such as photos, multimedia, games, privacy information, blocking of individuals) than the standard definition of a social graph, and edge weightings of the graph may be implied to designate link quality information, as is detailed in Serena, "Relationship Networks Having Link Quality Metrics with inference and Concomitant Digital Value Exchange," U.S. patent application Ser. No. 13/177,856, filed Jul. 7, 2011, which is hereby incorporated herein by reference. Furthermore, individuals have a view of the world via social networks that does not contain all links but contains a view of connectedness, including degrees of separation to neighbors in the graph structure (for example, suggested friends lists can be used as a basis for garnering information about the social graph).

SUMMARY

In one general aspect, the invention provides a method of operating an inferred digital social network. Consent is obtained from a plurality of users of at least one digital social network to participation in the inferred digital social network. Information is automatically obtained from the digital social network for the plurality of users of the digital social network. The information includes link information between each of the plurality of users and other individuals in the digital social network. The information is aggregated for the plurality of users to form the inferred digital social network, corresponding to a graph having nodes representing the plurality of users and the other individuals and having links between the nodes representing social relationships.

This aspect of the invention takes advantage of the fact that individuals or entities in a traditional social network can infer the overall structure of the traditional network in the individual's or entity's neighborhood and cognizant network (perhaps by many observations), and thus the individuals or entities in essence own their view of the graph structure and its appurtenant content (such as photos, comments, multimedia, texts, and video, subject to digital rights management, copyright, and privacy restrictions). These views of graph structure and content, to which the individual or entity has a legal right and technical ability to obtain, can be aggregated, in accordance with this aspect of the invention, to infer the graph structure of the traditional social network. Thus, this inference process can be either cooperative or non-cooperative with respect to the traditional social network providers. The inferred social network resulting from this process can be implemented independently of the traditional social network and function as its own social network. In certain embodiments the inferred social network and its appurtenant content is stored and implemented as a distributed peer-to-peer social network, and in other embodiments it is stored and implemented on a central server, or on a hybrid centralized and distributed network.

Further, cryptographic techniques (such as those set forth in Sections 3.6 and 3.7 of Bruce Schneier, *Applied Cryptography*, John Wiley & Sons, 1996, which are hereby incorporated herein by reference) can be applied to secure the interparty communications within the inferred social network, with secrets that can be decrypted only in concert with N other parties. So, shared content within the inferred social network (whether implemented with centralized server architecture or peer-to-peer architecture) can be kept private, away from any traditional social network provider. Consequently, privacy is no longer dependent on the stated objectives of a corporation that implements a traditional social network; rather, privacy is ensured by the storage mechanism itself of the inferred social network provided by the invention. For example, although traditional social networks have stated privacy policies, a member of a traditional social network could, for example, copy a profile page from the traditional social network and e-mail it someone. The privacy ensurance mechanism provided by this embodiment of the invention, in contrast, cryptographically ensures privacy by the storage mechanism itself, thereby preventing the kind of copying described above. This cryptographically ensured privacy can be extended to the inferred graph structure itself, such that the inferred graph structure itself can be reconstituted only by decryption in concert with N other parties.

One objective of inferring the graph structure in accordance with the invention is to create a portable social network extrinsic to any major entity (such as corporations that own traditional social networks), thereby allowing the users of the portable social network, individually and in aggregate, to own their own copy of a social network. The personally generated social network can have attached content and individual parameters (such as privacy settings) that supplement the online experience. The invention allows the individuals in aggregate to create a portable social network that could be copied to another traditional social network provider if members of the portable social network agree. So, for example, the portable social network could migrate from a first traditional social network to a second one, causing the first traditional social network to lose comments, conversations, etc., and the second traditional social network to obtain new users and new posts. Thus, this embodiment of the invention facilitates transfer of subnetworks of the social graph of a traditional social network to another traditional social network.

Thus, the consumer benefits from the increased portability described above, and from privacy that is cryptographically enforced rather than merely dependent on a stated policy of traditional social network providers. The portability and migration capability allow for the consumer or groups of consumers to transfer from a traditional social network provider without losing the extensive connections and state information intrinsic to the traditional social network.

The portability and inference infrastructure provided by the invention can be supported by direct subscription or could be advertising supported. Advertising can be provided by sending queries to the users and allowing the users to self-target the advertising by responding to the queries. Alternatively, data can be mined from the inferred digital social network and advertisements can be targeted to users based on the mined data. Alternatively, data can be directly mined locally from individual client computing devices with which individual users communicate with the inferred digital social network, and advertisements can be directly targeted to the individual client computing devices based on the mined data.

In another general aspect, the invention provides a method of operating an inferred digital social network, in which information is automatically obtained from a digital social network for a plurality of users of the digital social network. The information includes link information between each of the plurality of users and other individuals in the digital social network. The information is aggregated for the plurality of users to form the inferred digital social network, corresponding to a graph having nodes representing the plurality of users and the other individuals and having links between the nodes representing social relationships. Each of the plurality of users is enabled to send and receive message information with other ones of the users, to view profile information of other ones of the users, and to view social contact information of other ones of the users, through the inferred digital social network.

Thus, the inferred social network can, in follow-on actions, operate as its own stand-alone social network, albeit with information garnered from the inference process as well. In certain embodiments of the invention, this feature allows users to operate as a fully self-sufficient social network between migration periods from one underlying traditional social network to another. In other embodiments, the stand-alone inferred social network does not employ portability and is used instead permanently as a stand-alone social network.

In another general aspect, the invention provides a method of operating an application program spanning a plurality of the digital social networks. State information is obtained automatically from the plurality of digital social networks through a plurality of respective communication channels, which can be application program interfaces or covert or subliminal channels. Input is received from at least one user of the application program in response to the state information obtained from the plurality of digital social networks. In response to the input from the user of the application program, other state information is provided to the plurality of digital social networks that the digital social networks cause to be communicated to users of the digital social networks. This aspect of the invention makes it possible for multiple digital social networks to be spanned by applications such as online games, personal networking applications, gift-sending applications, product promotion applications, applications for identifying who is looking at a user's profile, applications for ranking connections to a user on the digital social networks, mobile messaging applications, and inferred digital social networks of the type provided by other aspects of the invention as described above.

In certain embodiments the spanning application is a program that provides a unified user meta-interface to enable sharing of content simultaneously across the plurality of digital social networks. This application program can enable digital social networking between the plurality of users across the plurality of digital social networks by enabling content sharing between the plurality of digital social networks. The content shared between the plurality of digital social networks can include a message sent from one of the users of one of the digital social networks to at least another of the users of another one of the digital social networks.

The details of various embodiments of the invention are set forth in the accompanying drawings and the description below. Other features and advantages of the invention will be apparent from the description, the drawings, and the claims.

DESCRIPTION OF THE DRAWINGS

FIG. 1 is a system overview diagram of the computational infrastructure of an inferred digital social network system in accordance with the invention.

FIG. 2 is a diagram of a traditional social network graph and an inferred social network graph produced in accordance with the invention.

FIG. 3 is a graphical diagram of a social network inference process in accordance with the invention.

FIG. 4 is a graphical diagram of the details of a process for aggregating inferred and directly entered state information in a social network inference process in accordance with the invention.

FIG. 5 is an image of a network inference opt-in interface portion of an inferred social network browser page produced in accordance with the invention.

FIG. 6 is an image of a network display portion of an inferred social network browser page produced in accordance with the invention.

FIG. 9 is a graphical diagram of a process in accordance with the invention for mining data from a digital social network.

FIG. 10 is an image of a user interface for opt-in credentials and settings, which is a portion of an inferred social network browser page produced in accordance with the invention.

FIG. 11 is a graphical diagram of the relationship between a multiple-network-spanning application in accordance with the invention and multiple digital social networks spanned by the multiple-network-spanning application.

FIG. 12 is a graphical diagram of a process in accordance with the invention for a multiple-network-spanning application obtaining state information from and providing state information to a digital social network.

FIG. 13 is an image of a user consent and initiation portion of an inferred social network browser page produced in accordance with the invention.

FIG. 14 is a system overview diagram of the computational infrastructure of a meta-social-network spanning application accordance with the invention.

FIG. 15 is a graphical diagram of a process in accordance with the invention for operation of a multiple-network-spanning application in accordance with the invention.

FIG. 16 is a graphical diagram of a process in accordance with the invention for operation of an inferred digital social network as a stand-alone social network.

FIG. 17 is an image of a browser page of an application that manages multiple social networks simultaneously in accordance with the invention.

DETAILED DESCRIPTION

Figure 7:
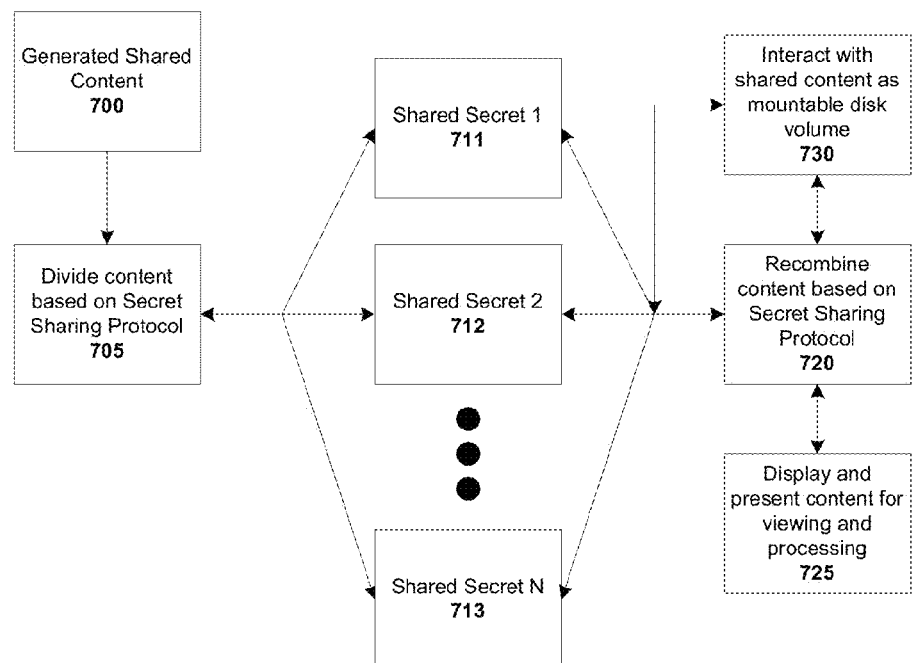
FIG. 7 is a graphical diagram of a process for secured distributed storage and recombination of shared content in an inferred digital social network system in accordance with the invention.

With reference to FIG. 1, there is shown the computational infrastructure of an inferred digital social network system. A group of traditional social network provider servers 2000, 2010, and 2020 are accessible to client computers 3001 operated by users of the traditional social networks, intrinsic applications, and direct queries 3002 from external servers 3000 and 3003 (for example, there is a FACEBOOK app that runs on FACEBOOK itself that allows certain queries). The inferred social network according to the invention is aggregated from information sources in a manner described below, and stored and accessed on inferred social network provider servers 3000 and client computers 3001. In alternative embodiments, the storage and accessing occurs entirely on one of computers 3001. The arrows in the diagram represent network connections between the components to which the arrows point. As is discussed below, peer-to-peer social networking and centralized processing are conducted with respect to the inferred social network provider. The inferred social network can have all of the properties of a traditional social network, but the social network may be owned directly by the individuals participating in this system.

Intrinsic in the establishment of the inferred social network is the ability to target market to its members. Members may benefit from receipt of advertising, including incentives, coupons, and other promotional material, such as digital value, cash, or watermarked advertising with digital cash as described in Serena, "Embedding digital values for digital exchange," U.S. Patent Application Publication No. 2009/0076904, which is hereby incorporated herein by reference. Members may choose to self-target advertising, and the self-targeting can be based on the members allowing localized searching of content by providers of advertising. Privacy can be maintained by allowing local searches on shared inferred network content, as is described below. Advertisers and marketers may view a group that has inferred their own social network and is now portable as an attractive target for specific ads. The group may share demographic aspects that allow them to demand greater incentives from advertisers. The advertising process will support the corporation that purveys the infrastructure for the inferred social network, and will provide a revenue stream for the provision of tools within the inferred social network. The infrastructure for the distributed computation required by the inferred social network, as is described below, provides capability for delivering advertising to the participants in the system and allowing individuals to reclaim their own network and contacts as their own property, in view of the fact that the individuals are generating the content delivered to the traditional social network. Furthermore, the inferred social network's business can be the subject of subscription-based pricing.

Thus, the portable inference infrastructure shown in FIG. 1 can be supported by direct subscription or could be advertising supported. Advertisements can be delivered through the browsing mechanisms or applications on client computers 3001 with which users interact with private social network provider servers 2000, 2010, 2020 and inferred social network provider server 3000. Advertisements can also be delivered through interaction with the inferred social network system. For example, third parties could be allowed to mine data from the inferred social network system and deliver advertisements in response, or keyword search information could be sent from the inferred social network system to the third party. The advertisements can be self-targeted. In other words, a user can opt into advertisements in which the user is interested, such as through a third party sending the user a query and the user responding. Advertisements may also be key-word directed, or replaced from other objectionable advertisements, for example. The advertising may be served up directly to the client infrastructure 3001 based upon local information and data on client computers 3001. In addition, advertising preferences may be set for the inferred social network.

Advertisements are served to client computers 3001 or inferred social network provider servers 3000 by a targeted advertising server 3003. In connection with interactions between targeted advertising server 3003 and client computers 3001, targeted advertising servers 3003 may load code and advertising on client computers 3001 for local keyword search not shared with inferred social network provider servers 3000, thus, allowing users to rest assured that others in the network cannot see user-specific advertisements, which would be based solely on the searches done on the user's own machine 3001. Advertisements are served locally at client computers 3001 and usage data is conveyed to targeted advertising server 3003 from client computers 3001.

Thus, the inferred social network system can allow for advertising, including purveyance of digital value, based on local searches of keywords on client computers 3001. The advertising process causes advertisements to be stored on a user's local machine 3001, based on self-targeting and keyword conveyance based on local searches of the content list. Therefore, the central advertisement server need only collect conveyance information and need not search conversations in the typical manner to convey advertisements. The advertisements would be resident on a client machine 3001 and private information could be searched privately and advertisements targeted, while the private conversation (or other multimedia interaction) need not be stored on a central server.

FIG. 2 shows diagrams of a traditional social network graph 1000 and an inferred social network graph 1020 produced in accordance with an inference algorithm that takes individual views of traditional social network graph 1000 and aggregates them into an overall inferred picture 1020 of the graph.

In this document a graph G is defined as an ordered pair (V, E) of a set V of vertices or nodes and a set E of edges, which are two-element subsets of V. A line graph of an undirected graph G is defined as another graph L(G) that represents the adjacencies between edges of G. That is to say, any two vertices of L(G) are adjacent if and only if their corresponding edges in G share a common endpoint ("are adjacent").

Users 1, 2, 4, and 5 in FIG. 2 opt in to the inferred social network, and so a graph structure 1020 is inferred based on the information about traditional social network 1000 obtained from the observations of users 1, 2, 4, and 5. In some instances, user 3 may be inferred from knowledge of 2 and 4's connections. Traditional social network graph 1000 represents the graph structure stored in the traditional social network provider's system. Depending on the resolution of a unique login name of user 3 (in order to ensure that common names are distinguished from one another, as is done by credit agencies) the inferred graph 1020 may show two connections to separate nodes from 2 and 4 rather than one node 3 connected to both nodes 2 and 4. Until sufficient information is garnered and the unique login identity of node 3 is ascertained, node 3 might not be resolved to a unique user. The inference algorithm uses profile information and other information garnered from user 1, 2, 4 and 5's data sources to resolve the ambiguity concerning user 3.

The algorithmic process for inferring a digital social network is outlined in FIG. 3. In step 1040, known adjacency links with potential weightings are obtained with respect to a particular user of one or more "target" traditional digital social networks, as is described in Serena, U.S. patent application Ser. No. 13/177,856, supra. Then, in step 1050, the system for inferring the digital social network merges this information with other views of the adjacency links for the same user as well as other users, in an iterative process, taking into account privacy restrictions of the inferred social network (discussed below). Aggregation logic 1060 is then applied. Aggregation logic 106 uses timestamps of the links, which show the links as of a certain time, since the graphs are constantly changing, to resolve the current view of the network or networks. When individual views are aggregated a view of the target social network or networks can be inferred that is of higher fidelity, including an ability to see far into the target network or networks, compared to the target traditional social network provider data model from which data is mined. From a real-time computational standpoint, the target network or networks have a time rate of change (i.e., additions, modifications, and deletes) and the graph inference model will lag behind the changes in the target network or networks. Eventually, however, the individual views in aggregate will catch up to the target network or networks for a specific time step. This time lag is a reality that is well known to those skilled in the art of database design. This invention addresses the time lag by capturing additions, modifications, and deletions to individuals' graph structures by allowing corresponding additions, modifications, and deletions to the user interface (discussed below) of the inferred social network.

Once the aggregation is complete, step 1070 causes each user's locally accepted view of the inferred graph to be stored, with admissible appurtenant digital content (such as digital content consistent with digital rights management restrictions, or photos legitimately taken from an underlying traditional networks based on privacy restrictions or copyright restrictions). In step 1080, an overview of the entire inferred graph is stored, with privacy protections of the type shown in FIG. 7 (discussed below). If information is stored locally at a client computer, it is encrypted if the operator the local machine is not supposed to see that information. If information is stored in a central server, the central server stores privacy information so the central server does not send data to parties who should not obtain it.

FIG. 4 illustrates in detail the aggregation process, discussed in connection with FIG. 3. This process aggregates inferred information and directly entered state information (such as a person being identified as a friend or on a block list, on a private target traditional social network itself). This information is obtained from a number of sources, including traditional social network login queries 5000 (such as clicking on a friend's page, or a display of a list of friends on a traditional social network), social network targeted advertising logic 5010 (such as a keyword search on a traditional social network that shows that a user is interested in a particular kind of music), and social networking intrinsic applications 5020 for querying graph data (such as a FACEBOOK app similar to FARMVILLE, which exposes a whole application program interface to mine the graph structure for information relevant to the inference process, instead of having to screen scrape through a browser as in block 5000). In addition, a data browser and/or application monitor 5050 monitors, captures content as it is input to, and enters data into, the traditional social network or networks, including acquiring graph appurtenant data such as photos, comments, multi-media, texts, and video, all of which can be kept intact during migration of the inferred social network from one traditional social network to another. In certain embodiments, browser or monitor 5050 acts as meta-user interface (discussed below in connection with FIG. 17) for interactions with multiple social networks (which in some embodiments can co-operatively supply information to the inference process). The information for a particular user is aggregated and stored at block 5010. By iteratively capturing inputs the inferred social network can be kept more current with respect to the target network and comments and other user generated content can be captured. Next, this aggregated information is further aggregated with corresponding information for multiple users in block 5020. In other words, after first aggregating a particular user's own information, multiple users' information is aggregated all together, in a process that produces, in block 5300, merged shared data of the social network, which is conveyed back to an internal model 5150 of the inferred social network. The resultant information in internal model 5150 is passed to an overall display model (block 5400) for display to users in the manner shown in FIG. 6, discussed below. This display can provide for multi-views of the social networks. In other words, given that a user has an internal model based on multiple traditional social networks, the user can select to show subject matter from only a first traditional social network or only a second traditional social network, or all of subject matter together. The display can also include actual links in the inferred social network functioning as a standalone social network, since the inferred social network is fully functional and can have its own links as well and its own state information. The social network monitoring and inference described in connection with FIGS. 3 and 4 can be built into a browser, an application, or an operating system itself.

FIG. 9 illustrates in detail the process of obtaining graph and content information (which is in turn part of the overall social network inference process disclosed in FIG. 3). In particular, in FIG. 9, graph and content information is obtained from a transaction monitor program 9020, which mines for contact information, and for which traditional social network the contacts come from, and for the http/https data that is being exchanged between a user's browser and a traditional social network provider (everything that comes up on a user's browser). Transaction monitor program 9020 may be a program, a browser or browser extension, or an intrinsic part of the operating system of the host platform.

A user typically interacts from an application 9005, such as a browser, with a traditional social network provider 9000. After a one-time opt-in process for each traditional network (shown in FIG. 5, discussed below), a query process 9030, which could log in automatically to the traditional social network, can directly query transaction traditional social network provider 9000. The queries to traditional social network provider 9000 may be in http or https accesses, intrinsic FACEBOOK apps or other traditional social network apps, target ad information queries, or other database query mechanisms. Query process 9030 can also query transaction monitor application 9020, thereby pulling information from a user's computer such as new information from an OUTLOOK contact list or other contacts list. Query process 9030 can also query target advertisement information (see box 5010 in FIG. 4), for example by obtaining the target advertisement information through an application program interface of traditional social network provider 9000, the application program interface being designed for advertising purposes and providing data that the advertisers use to target advertisements. This advertising data can be used to obtain information about the graph and its content. In addition, often browser application 9005 interacts with OUTLOOK or other social network contact management systems 9010. This information leaves residual markers in the host user's social contact list database for social network contact management system 9010, such as a FACEBOOK URL, webpage address, or LINKEDIN photos having a LINKEDIN logo on them. Transaction monitor application 9020 queries the intrinsic data of social network contact management system 9010 (such as whatever data is in a user's OUTLOOK contacts list), and also monitors the process of additions, edits, insertions, and deletions into or from database to garner the user's direct neighbor list. A merge process 9040 (which corresponds to blocks 5200-5400 in FIG. 4) accesses data sources from different users and applies internal inference logic to further characterize the connections of the social network graph. As more and more people opt in to the inference process a better picture of the social network emerges for all users. Aggregated information is more comprehensive than the individual views of the traditional social network data.

Not only do transaction monitor application 9020 and query process 9030 garner information about the graph structure; the actual multimedia and text content (such as conversations) is stored privately. Once the graph structure is known from FIG. 9, this data can be added to the appropriate nodes or links. The information such as multimedia, photos, text, and music content, is placed in a database for retrieval based on the inferred graph structure of the network. The starting point for user interaction with the inferred digital social network is shown in FIG. 13, which presents the entry point for the inferred social network functionality for a user (who might have been invited into the inferred social network by a friend on a traditional social network). The system allows a user to enter a login name and password in box 12150, and to register for the inferred social network using register button 12130. Button 12110 allows downloading of supporting applications to facilitate all of the aspects of the inferred social network. Terms of service must be agreed to using box 12100, and the terms of service can be accessed using box 12120. In addition, help with the login initiation process is available through system help link 12140. Upon completion of the user consent and initiation of participation process, the inferred social network can be accessed with all of the functionality of a traditional social network.

After the user consents to participation in the inferred social network, the user can "opt in" to the inferred network obtaining information from multiple traditional social networks. FIG. 5 shows an opt-in interface that allows the user to opt in to multiple social networks, thereby capturing as much state and graph theoretical link information as is available. The opt-in process captures login information so that the user's automated inference engine can engage in direct queries of each traditional social network provider. Column 704 allows for entering of login information or editing of same. Column 705 displays some status information about the target network. Columns 701 and 702 display graphics and naming of the traditional social network providers. An opt-in button 703 allows for commencing inference on a particular target traditional social network.

Once the user as elected to opt in to a traditional social network through the process described above, the user is allowed to set inference methods and privacy settings for the particular traditional social network, through the user interface shown in FIG. 10. Login credentials are obtained through boxes 10110 for a given traditional social network represented by logo 10100. The user sets the level of inference by the system with respect to the particular traditional social network using menu 10120, and the user sets privacy settings associated with the inference process using menu 10130. The settings are captured and saved when the user selects save box 10120, or else the settings are canceled. The settings for privacy can allow defined subgraphs of users to join in the inference process, and can set the extent to which the inferred social network results are shared. Menu 10130 can also be used to select the types of inference allowed. For example, shared information can be constrained to native friends in the manual settings of the inferred social network. Alternatively, privacy settings for the inference process can depend on a particular degree of separation such as "friends of friends." This process restricts the collaborative setting for the inference process to a specific subgraph or subgroup in a user's inference network. Similarly in menu 10120, the inference model can be selected along with sources of the information: "Direct queries" may be possible with such instruments as intrinsic FACEBOOK or GOOGLE+ apps; "collaborative inference" is the process described herein that allows for groups of people or entities to pool their inference capabilities to obtain a more accurate model of a traditional social network's graph structure.

After the user has consented to participation in the inferred social network (FIG. 13) and "opted in" to the inferred network obtaining information from multiple traditional social networks (FIGS. 5 and 10), the user can access an inference network display, an example of which is shown in FIG. 6. FIG. 6 displays a graph isomorphic to graph 1020 of FIG. 2. The links 605, 606, 614, and 620 represent multi-traditional social network connections (i.e., connections from multiple traditional social networks in the same view) and some native connections for the inferred social network. For example, links 620 and 605 may represent LINKEDIN connections in concert with a link for the inferred social network, and link 614 may be a link that is a FACEBOOK link. Link 606 may represent a link that exists solely within the inferred social network itself. Individual users in the graph are represented by nodes 610, 611, 612 and 615. The basic information for the links and nodes is accessible through the inferred network connections. Individual links in FIG. 6 can be color-coded to indicate the source traditional social network for the information. The user can click on the nodes and links to pull up the appurtenant social content and information associated with the nodes and links.

After the social network is inferred, additional content can be added to the interaction. Interactions can take place extrinsic to the traditional social network providers, and content can be stored and accessed in a cryptographically secure manner by applying basic "secret splitting" protocols such as those set forth in the following references: Sections 3.6 and 3.7 of Bruce Schneier, *Applied Cryptography*, supra; A. Shamir, "How to Share a Secret," Communications of the ACM, v. 24, n. 11, November 1979, pp. 612-13; G. R. Blakley, "Safeguarding Cryptographic Keys," Proceedings of the National Computer Conference, 1979, American Federation of Information Processing Societies, v. 48, 1979, pp. 313-317; G. J. Simmons, "An Introduction to Shared Secret and/or Shared Control Schemes and Their Application," in Contemporary Cryptology: The Science of Information Integrity, G. J. Simmons, ed., IEEE Press, 1992, pp. 441-497; Y. Desmedt and Y. Frankel, "Threshold Cryptosystems," Advances in Cryptology-CRYPTO '89 Proceedings, Springer-Verlag, 1990, pp. 307-315; Y. Desmedt and Y. Frankel, "Shared Generation of Authentication and Signatures," Advances in Cryptology-CRYPTO '91 Proceedings, Springer-Verlag, 1992, pp. 457-469; I. Ingemarsson and G. J. Simmons, "A Protocol to Set Up Shared Secret Schemes without the Assistance of a Mutually Trusted Party," Advances in Cryptology-EUROCYRPT '90 Proceedings, Springer-Verlag, 1991, pp. 266-282; P. Feldman, "A Practical Scheme for Non-interactive Verifiable Secret Sharing," Proceedings of the 28$^{th}$ Annual Symposium on the Foundations of Computer Science, 1987, pp. 427-437; T. P. Pederson, "Distributed Provers with Applications to Undeniable Signatures," Advances in Cryptology-EUROCRYPT '91 Proceedings, Springer-Verlag, 1991, pp. 221-242; A. Beutelspacher, "How to Say 'No'," Advances in Cryptology-EUROCRYPT '89 Proceedings, Springer-Verlag, 1990, pp. 491-496; K. M. Martin, "Untrustworthy Participants in Perfect Secret Sharing Schemes," Cryptology and Coding III, M. J. Ganley, ed., Oxford: Clarendon Press, 1993, pp. 255-264. Additional content can be in the form of "relationship pages," link-quality indications or other shared digital content, as is described in Serena, U.S. patent application Ser. No. 13/177,856, supra.

FIG. 7 illustrates a process for secured distributed storage and recombination of shared content, using shared secrets, as is described in the cryptology references cited above, to divide private shared content between users and then recombine the shared content with the cooperation of a requisite number of users. First the shared content is generated in step 700. This content could be a conversation or other multimedia content. Then the information is divided in step 705. The shared secrets can be divided by an individual or divided by another protocol without that individual (as described in Sections 3.6 and 3.7 of Bruce Schneier, *Applied Cryptography*, supra) such that the shared secret is stored in N encrypted parts 711, 712 and 713. The information is accessed and recombined in step 720 according to a secret sharing protocol (by conveying parts 1 through N in an encrypted format; getting the other parties to the secret to send their shares, and then recombining the parts). The whole private network can work this way. For example, 3 of 5 key people may be required to cooperate in order to reconstitute the network. Although not shown in the figure, a write to a shared disk volume (any change in the data) can be treated as new generated shared content and stored via the cryptographic protocol initiated at step 700, or else it won't be protected; in this case everyone knows the secret already, but the protocol is implemented to make it harder for someone else to obtain it. The secret could be the graph itself, or appurtenant content. The protocol could require one member, or a requisite number of members to assent in order to reconstitute the information. Private page files of the mounted disk volume will minimize network traffic in executing the protocol, culminating in display and presentation of the shared content for viewing and processing (step 725) and interaction with a mountable disk volume such as a shared volume that would be privacy encrypted and displayed on a client computer under "my computer" (step 730).

The inferred social network can be constructed in such a manner that it can be made portable between traditional social network providers. This portability allows individuals or groups of individuals to migrate between traditional providers en mass—possibly to make a political statement. This portability also allows groups of individuals to boycott certain providers if they do not like their privacy or advertisement disbursement methodologies for example. Boycott rights have special status in many countries for asserting consumer protections. For example, if a parent group wants to move its children off of the major provider of the social network they can do so with this portable inferred social network schema. An additional example could be a group of children on a network maturing at the same time and migrating en mass to a traditional social network while preserving their shared content. The portability allows the moving group to control its online experience with respect to the social network and ensure that the group's policies are being adhered to by the traditional provider. The group migration rationale and rights are often intrinsic to many worldwide legal systems. The group may use actual migration or the threat of migration to change onerous legal terms of service or negotiate payments for the intrinsic value of that group's inferred social network.

Migration can be an assertion of intrinsic legal rights of an individual or group and their implicit and explicit rights over their own social network and connectivity in the host legal system. Countries may actually adopt laws that are more conducive to the assertion of group legal rights of migration across traditional social network providers. These existing rights can support the maintenance of the inferred social network by individuals and their groups. Certain rights of the individual and groups transcend any terms of service to aggregate and analyze the data from their own social contacts. For example, a traditional social network typically restricts what can be done on the network, but the private network of the invention is not so restricted. While these rights of individuals and groups are host-country specific, generally it is acknowledged that ownership of one's social contacts is one's own right in concert with one's social network's acquiescence In other words, if other people acquiesce to participating in an individual's social network, then an individual has the right to what they agree to.

Distributed peer-to-peer functionality and storage of information can be employed, with no central server, thereby ensuring against inappropriate restriction by governments hostile to freedom of speech and association.

Voting by formed subgroups of an individual (all the people who have opted into an individual's or subgroup's private network) can be conducted once an inferred social network has been established. Subgroups of the network can vote to extricate themselves from onerous terms of service that do not sufficiently respect privacy rights, protection of minors, or free expression, for example. These terms of service can be renegotiated by threatening transfer of one's group to another social network. This kind of action has been largely precluded due the complexity of maintaining ones interconnections across multiple traditional social networks. The present invention facilitates such transfers, while maintaining privacy of the social network graph in an open format that enforces privacy through cryptological techniques and conducts agreement/voting protocols for group decision-making. Whenever people aggregate information, there are consequences to other people, such as their privacy, and cryptological techniques provide a mechanism for protecting privacy.

Figure 8:
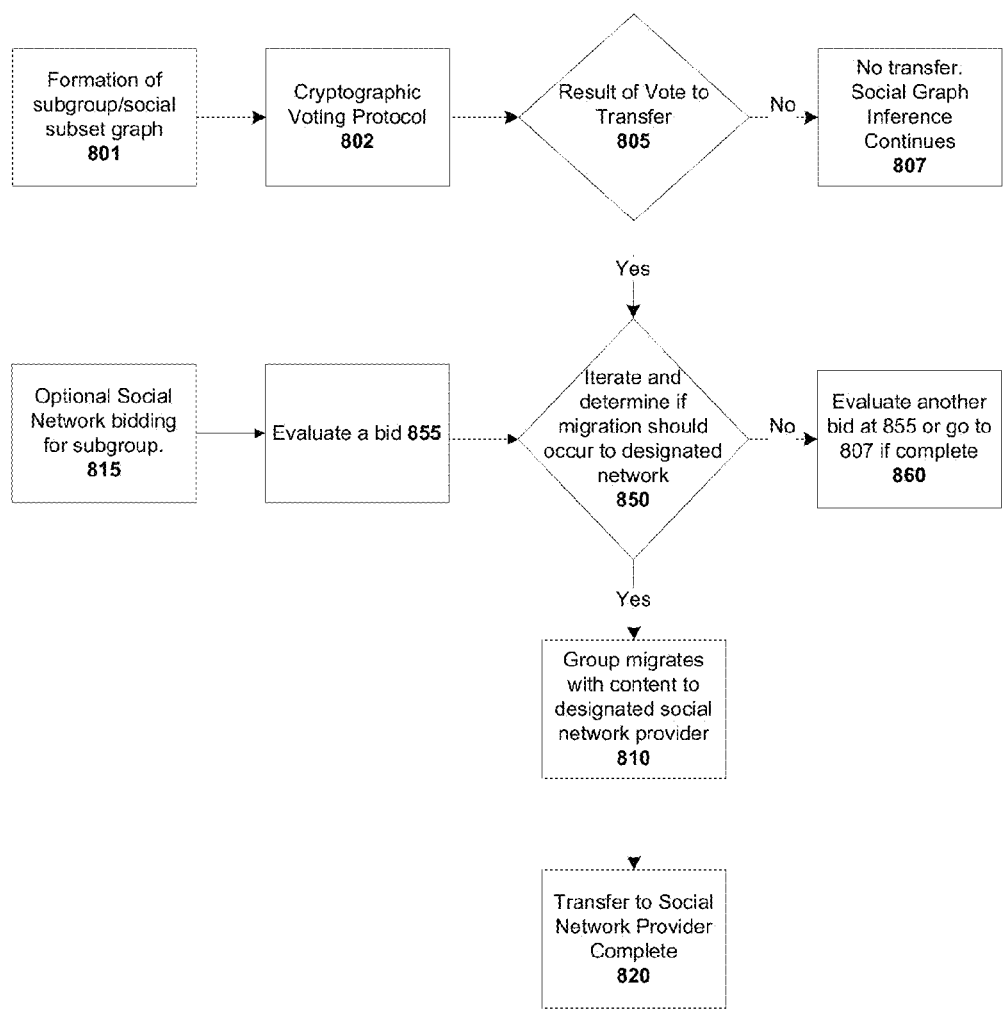
FIG. 8 is a flowchart diagram of a process in accordance with the invention for group voting to transfer or migrate an inferred social network from a traditional social network provider.

FIG. 8 demonstrates how a group, formed at step 801, can choose to migrate from a social network provider. A cryptographic voting protocol can be applied (step 802) to initiate the migration process from a traditional social network. The result of the voting process yields a decision at step 805. If the decision is no, the social graph status quo is maintained (step 807). If the decision to migrate is yes, the group migrates to a designated social network provider. This invention allows for a bidding process (step 815) from the destination traditional social networks where they bid with resources and terms of service for the migrating group. Each bid is evaluated (step 855), and a decision is made with respect to each bid, iteratively whether to migrate to the new social network (step 850). If the decision is no, another bid is evaluated, or, if there are no more bids, the social graph status quo is maintained (step 860). If the decision to migrate is yes, the group migrates with all of the content of the inferred social network to the designated social network provider (step 810), and the process is complete (block 820). Ultimately, the group transfers to the most favorable conditions for the group (the group votes collectively to which network it likes best, and the group migrates into the winning bidder).

The private social network framework described above can support types of shared content that are meta-traditional-social-network. In particular, there can be games (see FIG. 11) that span a number of social networks. The games can be designed to engage participants across several social networks simultaneously. The system can cooperatively play games and share content across multiple social networks simultaneously. Other games could pit groups from one social network against another for "tug-of-war" games based on relative strengths of their social connections. In general, a plug-in application framework for the inferred social network can be provided to allow not only games but general applications that work in the inferred social network framework. The apps can be such things as contact management tools to manage contact migration from one traditional social network to another. For example, a particular user could have a friend on LINKEDIN that he thinks would be better suited to a connection on FACEBOOK. The app facilitates management of contact migration across social networks. The user's friend could be added to FACEBOOK and delete from LINKEDIN. The inferred social network maintains all contacts and the network model. Also, relationship networks as described in Serena, U.S. patent application Ser. No. 13/177,856, supra, can span a number of traditional social networks while being supported by the private social network framework described above. Other types of applications that can be supported by the inferred social network include applications for marketing, barter, auction, or exchange of digital value, applications for suggesting friends or reaching individuals who are not yet participants of social networks.

Thus, the inferred social network supports content extrinsic to traditional social network providers, thereby enhancing the traditional social network experience. The inferred social network also supports concurrent management of multiple traditional social networks, such as, at a minimum, supporting simultaneous conversations across multiple networks and supporting content sharing between platforms. In, addition privacy settings and digital rights management can be set across multiple platforms.

The inferred social network as a stand-alone network will have profile information about the user. That profile information can be added to or deleted from the managed traditional social networks or vested only in the inferred social network. For example, resume information may be posted to LINKEDIN by the inferred social network; however FACEBOOK and GOOGLE+ would not obtain that information.

The inferred social network can be stored either as a distributed system, central server, peer-to-peer system, or hybrid (for example, the peer-to-peer functionality of the inferred social network can be supplemented with centralized servers for ease of computation in early instantiations of network). The specific details of the network storage method and retrieval can be abstracted away though standard data queries that hide the concurrent and distributed logic from application programming interfaces with which the inferred social network interacts. Once the abstracted data structure adequately addresses concurrency, versioning, and shared accesses, the system allows for the standard queries of the traditional social network and advanced queries of the inferred, private social network. The advanced queries allow for spanning multiple social networks and managing interactions across networks. Furthermore, the profile can be searched to obtain friends with shared interests (based on profile information) and to manage friendship placement in and removal from the appropriate traditional social network.

As was mentioned above, the inferred social network can operate as a functional traditional social network, as is shown in FIG. 16. First the inference process defines and aggregates information to form the network (step 16000). Then, in an iterative process, the network is used as a functional social network (step 16010). The functionality that is provided by traditional social networks such as GOOGLE+ and FACEBOOK can now be executed. Illustrated in the figure are some elements of the functionality; however, basic functionality as is known to those skilled in the art may be incorporated. For example the inferred social network allows its users to send and receive messages (step 16020). Further, content can be shared such as photos or video (step 16030). Both profile and contact information can now be viewed (steps 16040 and 16050). The inferred social network described above is one example of an application that spans multiple traditional social networks and supports applications, such as games, that also span the multiple traditional social networks. A similar framework can support other types of "spanning" applications, entirely distinct from inferred social networks.

FIG. 11 illustrates, generally, a spanning application 11140 that is capable of spanning multiple social networks 11100, 11110, 11120, and 11130 simultaneously or sequentially. The principal concept is a unified execution structure whereby an application 11140 can span multiple social networks 11100, 11110, 11120, and 11130. That is to say, application 11140 automatically obtains state information form social networks 11100, 11110, 11120, and 11130, receives input from a user in response to the state information, and in response to the input from the user, provides other state information to social networks 11100, 11110, 11120, and 11130 that the social networks communicate to their users, The application 11140 may actually execute using native APIs of the traditional social networks, or application 11140 can communicate information through sockets, http, remote procedure calls, or other methods known to those skilled in the art for application communication, including covert or subliminal channels (described below) if native application programming interfaces of the social networks do not allow sufficient interaction of the spanning application with the social networks. The system can be implemented such that code for the spanning applications executes on one or more client computers 3001 in FIG. 1 or any of the other computational systems shown in FIG. 1 or FIG. 14. The communication techniques can yield the ability to conditionally transmit data to another social network, inclusive of the inferred social network, through a variety of communication methods. The spanning application in one embodiment can run on an inferred social network provider 3000 or an advertising provider 3003 shown in FIG. 1, or on a social network provider 13000, 13010, 13020 or a social network client 13040 or a spanning application support server 13030 shown in FIG. 14, to interact with the multiple social networks. The spanning application can be implemented in a number of ways using standard distributed computation methods or standard client-server models of computation. The presentation of the application information similarly can take known forms as the user interface design allows. In certain embodiments, the spanning application accesses the APIs of traditional social network providers and the API for an inferred social network provider if it is present. Digital information appurtenant to the graph structure of the network (such as photos, comments, multi-media, texts, and video) is available at the inferred social network, and similarly the spanning application can collect or infer information and viably disseminate it to other spanning applications. The availability of the APIs for social network providers that access the graph structure allow for the creating of spanning applications that access all of the APIs of all of the social networks concurrently and that compute across all the social networks available. This technique enables the user of the spanning application to be presented with a seamless appearance of the user interface across the multiple social networks FIG. 12 illustrates how a social network spanning application described in FIG. 11 accesses the intrinsic API of a native social networking platform (block 12001). There are standard communication mechanisms (block 12002) available to the native APIs of the social network. In addition, there are nonstandard typical modalities of communication not typically allowed in the social network API such as sockets and remote procedure calls. From given allowed communication accesses in a native social networking application, the nonstandard modalities can be constructed, thereby expanding the capabilities of the available API for the spanning applications. These communication mechanisms allow communication between the native social networking platform and the spanning application or social networking server infrastructure 12003, to allow the spanning application to execute across multiple social networking systems. As was previously stated, the server infrastructure can be distributed (peer-to-peer) or centralized in design.

FIG. 14 illustrates the computational infrastructure for a social network spanning application. Multiple social network providers 13000, 13010, and 13020 each have their own computer infrastructure. APIs may be available for access by the spanning application. Spanning applications can run on social network clients 13040, social network providers 13000, 13010, and 13020, or spanning application support server infrastructure 13030. The components of the computational infrastructure communicate over a TCP/IP internet system represented by arrows in the figure. Communication can be direct when provided by intrinsic APIs of the subsystems, or when there is insufficient support, covert or subliminal channels can be constructed to allow communication between constituent spanning application subsystems.

In particular, social network providers 13000, 13010, and 13020 may or may not provide an API for accessing their information and designing applications that are resident on their network. The API may be of sufficient maturity to allow for standard communication mechanisms. In the absence of direct API procedure calls for communications, however, it is possible to convey information through covert or subliminal channels. The literature known to those skilled in the art provides example methods whereby accessing information such as web links can convey binary values. Once binary values have been conveyed, standard communication mechanisms may be constructed out of the covert channel. A covert channel can be used to write from a read-only API, such as by toggling between multiple read accesses, as is known in the art, and on top of the covert channel it is possible to build communication constructs such as sockets, remote procedure calls, or other communication mechanisms. This practice allows the traditional social network intrinsic API to be expanded to convey additional information. This information will be used as input to the social network spanning application as it performs standard execution on its appurtenant host platforms. FIG. 15 depicts the general operation of a social network spanning application. The application is capable of gathering input data and interacting with the social networks through multiple APIs appurtenant to the social networks (block 15000). The application also obtains user input into the spanning application (block 15010). The information is aggregated and the application can run and communicate with multiple social networks through clients, servers and social network APIs (block 15020). If the intrinsic API of the social network does not support communication with the server or client infrastructure, a covert channel known to those skilled in the art may be used for this purpose. The social networks accessed by the spanning application can conditionally include an inferred social network of the type described above. An example application could be a game, (such as FARMVILLE or any similar social-network-based game), in which players are obtained from multiple social networks. The game communicates messages about the state of the game back to the multiple social network APIs (block 15020) after computing what changes in state information have occurred. The game can be played across all social networks simultaneously. Yet another example is a spanning application that serves up shared content that is accessible to selected users but stored extrinsically to any one social network, the shared content including items such as photos or conversations, including private photos that only friends share and not held on any one social network. Other examples or spanning applications include: opt-in advertising applications for multiple social networks; personal networking applications, such as business networking applications; gift sending applications; product promotion applications; search Engine promotion applications; applications for identifying, across multiple social networks, who is looking at a user's profile; birthday greeting applications for multiple social networks; applications for ranking connections to a user on multiple social networks; mobile messaging and SMS applications; applications for publishing blogs, media, and other material to multiple social networks; applications for customer interaction on multiple social networks, including targeted advertising applications and customer feedback applications; e-mail list management applications; polling applications; coupon applications; contest applications; appointment scheduling applications; shopping cart applications; and, many other types of applications.

Another example of a spanning application is an application that ensures consistent messaging and conversation state across multiple social networks. As is shown in FIG. 17, such an application manages multiple social networks simultaneously and functions as a meta-interface to the multiple social networks. With the meta-social networking system management interface one can obtain cognizance of content and conversations across multiple social networks. An inferred social network may or may not be included as one of the social networks spanned by the spanning application, and in general this spanning application may either be supported by an inferred social network architecture of the type described above or it may operate wholly independently of any inferred social network architecture. The meta-interface and management system allows for maintenance of private content (e.g., photos, music, video, and other media represented by icons 156 or, in other examples, the conversation as a whole). Conversations and interactions between users can span multiple social networks, shown in network interfaces 152 and 160. The meta-interface displays responses to content shared between networks and maintains the conversation state across the meta-social-networking construct. For example, Alice broadcasts on all networks that she saw a great video (comment 154). Bob responds only on traditional social network 1 that he enjoyed the video to 155 and posts content (possibly private as described herein) to a shared context extrinsic to all of the traditional networks (media represented by icons 156). Eve and Stewart respond on their respective traditional social networks 1 and 2 (comments 157). And finally, in the conversation Alice and Bob post (not necessarily in tandem) a comment to all networks, possibly inclusive of the inferred network (comment 158). Interfaces 152 and 160 represent user interface elements to the underlying social networks to enable the user to manage the multiple social networks simultaneously from one meta-social networking program. The multiple social network interfaces may be a graph such as is shown in FIG. 6, albeit links and nodes may be colored with which social network each link or node originated from. This interface shown in FIG. 17 is illustrative and may take other user interface forms known to those skilled in the art of user interface design and social networking programming. Privacy settings and Digital Rights Management for the conversation elucidated in FIG. 17 may be applied by the user or the owner of the content shared. In FIG. 17, the user sends messages from one social network to another user that may be confined to only one social network. For example, in comments 157, Stewart may only belong to traditional social network 2 and Eve may only choose to belong to traditional social network 1. Standard messaging protocols know to those skilled in the art will be applied to facilitate transmission across multiple social networks.

A system has been described whereby individuals can take back ownership of their own social network information by collaboration technically and politically to obtain a picture of the network: "the inferred social network." This view of the network is distributed, time-stamped, and versioned so that collaborating individuals can use it as one does a traditional social network with additional functionality as enumerated herein. Advertising and incentives derived from the inferred social network can be purveyed to users and remuneration can be meted out to the appropriate parties. Furthermore, privacy is no longer just a stated property of shared online content; it is protected by known cryptographic protocols and techniques such as those described in the cryptology references cited above. The flow of data in this system can be distributed in such a manner that individuals "own their own" social network and establish connections via inference and behavior as a traditional social network does. In essence, the individuals own their own picture of the social network both legally and technically. Applications can be developed that span multiple social networks, both traditional and inferred social networks. Such spanning applications can be supported by the inferred social network or can function independently of an inferred social network. The inferred social network infrastructure can be supported by all forms of advertising or direct subscription. While nothing herein should preclude the operation of the inferred social network as a traditional social network, the invention is not just social network analysis; it is social network analysis to establish a useable inferred social network or equivalently meta-social-network interface with added features, as well as spanning applications that work across multiple social networks.

While several particular forms of the invention have been illustrated and described, it will be apparent that various modifications and combinations of the invention detailed in the text and drawings can be made without departing from the spirit and scope of the invention. Also, references to specific flowchart steps or specific browser pages and the elements thereof are also not intended to be limiting in any manner and other steps and elements could be substituted while remaining within the spirit and scope of the invention. Accordingly, it is not intended that the invention be limited, except as by the appended claims.

What is claimed is:

1. A method of operating a computer-based inferred digital social network, comprising the steps of:
   obtaining knowing consent from a plurality of users of at least one digital social network, to participation in an operational inferred digital social network,
   automatically obtaining, by computerized data mining logic implemented by a processor, information from the at least one digital social network for the plurality of users of the at least one digital social network, the information including individual views, for the plurality of users, of an overall graph structure of at least a neighborhood of the at least one digital social network, the graph structure having nodes representing individuals in the at least one digital social network and links representing connections between the individuals,
   aggregating, by computerized aggregation logic implemented by a processor, the information for the plurality of users to form an inferred digital social network corresponding to a graph having nodes representing the plurality of users and the other individuals, and having links between the nodes representing social relationships, the aggregating step comprising automatically aggregating the individual views of the overall graph structure for the plurality of users into an inferred picture of the at least one digital social network that is more comprehensive than the individual views of the overall graph structure, and forming the inferred digital social network from the inferred picture of the at least one digital social network, storing the inferred digital social network, and enabling access thereto, on at least one computerized digital data processing system, and obtaining knowing consent, from at least some of the other individuals in the at least one digital social network with whom ones of the plurality of users are linked, to participation in the operational inferred digital social network, enabling digital social networking between the plurality of users and the other individuals who knowingly consent to participation in the operational inferred digital social network, using a respective plurality of computerized digital data processing systems, within the inferred digital social network, apart from the at least one digital social network from which the inferred digital social network is formed, by enabling shared content within the inferred digital social network between the plurality of users, and by enabling links within the inferred digital social network to be formed apart from the information obtained from the at least one digital social network from which the inferred social network is formed, the links being formed between nodes of the graph of the inferred social network that represent ones of the users for whom content sharing is enabled within the digital social network with other ones of the users, such that the graph has a structure that changes state when the links are formed.

2. The method of claim 1, further comprising copying the inferred digital social network to at least one other digital social network so that the graph is incorporated into the at least one other digital social network.

3. The method of claim 2, further comprising receiving votes from the plurality of users to migrate the inferred digital social network to the at least one other digital social network, and wherein the step of copying the inferred digital social network to the at least one other digital social network is based on a requisite number of votes being received.

4. The method of claim 1, further comprising dividing a digital representation of the graph based on a secret sharing protocol, obtaining assent from at least a threshold number of the plurality of users, and recombining the digital representation of the graph based on the obtained assent, the secret sharing protocol comprising conveying to the plurality of users a respective plurality of encrypted parts of the graph; getting at least the threshold number of the plurality of users to return their respective parts of the graph, and then recombining the returned respective parts of the graph to reconstitute the digital representation of the graph.

5. The method of claim 1, further comprising storing the shared content in a distributed manner.

6. The method of claim 5, wherein the shared content is stored in a peer-to-peer manner.

7. The method of claim 1, further comprising dividing the shared content based on a secret sharing protocol, obtaining assent from at least some of the plurality of users, and recombining the shared content based on the assent, the secret sharing protocol comprising conveying to the plurality of users a respective plurality of encrypted parts of the shared content; getting at least the threshold number of the plurality of users to return their respective encrypted parts of the shared content, and then recombining the returned respective encrypted parts of the shared content to reconstitute the shared content.

8. The method of claim 1, wherein the shared content is a message sent from one of the users to another of the users.

9. The method of claim 1, further comprising copying the shared content to the at least one digital social network.

10. The method of claim 1 wherein the step of automatically obtaining information from the at least one digital social network comprises accessing a native application programming interface for the at least one digital social network and obtaining the information through the application programming interface.

11. The method of claim 10, wherein the step of accessing the native application programming interface is performed through an app of the at least one digital social network.

12. The method of claim 10 further comprising copying information from the inferred digital social network to the at least one digital social network through the application programming interface.

13. The method of claim 1 wherein the step of automatically obtaining information from the at least one digital social network comprises obtaining the information through a covert or subliminal channel.

14. The method of claim 1 wherein the step of automatically obtaining information from the at least one digital social network comprises employing a browser that functions as a meta-user interface to a plurality of digital social networks.

15. The method of claim 1, wherein there are a plurality of the digital social networks, spanned by the inferred digital social network, from which the information is obtained, and the method further comprises copying at least some of the aggregated information to at least one of the digital social networks spanned by the inferred digital social network.

16. The method of claim 1, wherein there are a plurality of the digital social networks, spanned by the inferred digital social network, from which the information is obtained, and the method further comprises:
enabling digital social networking between the plurality of users within the inferred digital social network by enabling shared content within the inferred digital social network between the plurality of users; and
copying at least some of the shared content to at least one of the digital social networks spanned by the inferred digital social network.

17. The method of claim 1, wherein there are a plurality of the digital social networks, spanned by the inferred digital social network, and wherein the method further comprises enabling each of the plurality of users to opt in to individual ones of the digital social networks to permit information to be obtained automatically from therefrom.

18. The method of claim 1, further comprising enabling the users to set a level of inference for the information to be obtained automatically from the digital social network.

19. The method of claim 1, further comprising enabling the users to set privacy settings for the information to be obtained automatically from the digital social network.

20. The method of claim 1, wherein the other individuals include individuals distinct from the plurality of users.

21. The method of claim 1, further comprising storing the inferred digital social network in a distributed manner.

22. The method of claim 21, wherein the shared content is stored in a peer-to-peer manner.

23. The method of claim 1, wherein the steps of automatically obtaining information from the at least one digital social network and aggregating the information are iteratively repeated to capture additions, modifications, and deletions in the at least one digital social network and to reflect the additions, modifications, and deletions in the inferred digital social network.

24. The method of claim 1 further comprising providing advertising through the inferred digital social network to the plurality of users.

25. The method of claim 24 wherein the step of providing advertising comprises sending queries to the users and allowing the users to self-target the advertising by responding to the queries.

26. The method of claim 24 wherein the step of providing advertising comprises mining data from the inferred digital social network and targeting advertisements to users based on the mined data.

27. The method of claim 24 wherein the step of providing advertising comprises directly mining data locally from individual client computing devices with which individual users communicate with the inferred digital social network, and directly targeting advertisements to the individual client computing devices based on the mined data.

28. The method of claim 1, wherein there are a plurality of the digital social networks, spanned by the inferred digital social network, and wherein the method further comprises employing the inferred digital social network to enable digital social networking between the plurality of users across the plurality of digital social networks by enabling content sharing simultaneously across the plurality of digital social networks.

29. The method of claim 28 wherein the content shared between the plurality of digital social networks comprises a message sent from one of the users of one of the digital social networks to at least another of the users of another one of the digital social networks.

30. The method of claim 1, wherein there are a plurality of the digital social networks, spanned by the inferred digital social network, and wherein the method further comprises employing the inferred digital social network to enable individual ones of the users to set privacy settings across the plurality of digital social networks.

31. The method of claim 1, wherein there are a plurality of the digital social networks, spanned by the inferred digital social network, and wherein the method further comprises employing the inferred digital social network to enable individual ones of the users to set digital rights management across the plurality of digital social networks.

32. The method of claim 1, wherein there are a plurality of the digital social networks, spanned by the inferred digital social network, the method further comprising:
  automatically obtaining state information from the plurality of digital social networks through a plurality of respective communication channels,
  receiving input from at least one user of an application program in response to the state information obtained from the plurality of digital social networks, and
  in response to the input from the user of the application program, providing to the plurality of digital social networks other state information that the digital social networks cause to be communicated to users of the digital social networks.

33. The method of claim 1 wherein the step of enabling digital social networking between the plurality of users comprises enabling each of the plurality of users, using a respective plurality of computerized digital data processing systems, to send and receive message information with other ones of the users, to view profile information of other ones of the users, and to view social contact information of other ones of the users, through the inferred digital social network, apart from the at least one digital social network from which the inferred digital social network is formed.

34. The method of claim 33 wherein the at least one digital social network comprises a plurality of digital social networks, and the step of automatically obtaining information from the at least one digital social network for the plurality of users of the at least one digital social network comprises automatically obtaining information from the plurality of digital social networks.

35. The method of claim 1, wherein the individual views, for the plurality of users, of the overall graph structure of at least a neighborhood of the at least one digital social network are views to which the users have a legal right and technical ability to obtain.

* * * * *